June 3, 1952 W. W. HENNING 2,599,450
ROTARY PUMP AND MOTOR HYDRAULIC TRANSMISSION SYSTEM
Filed June 20, 1947
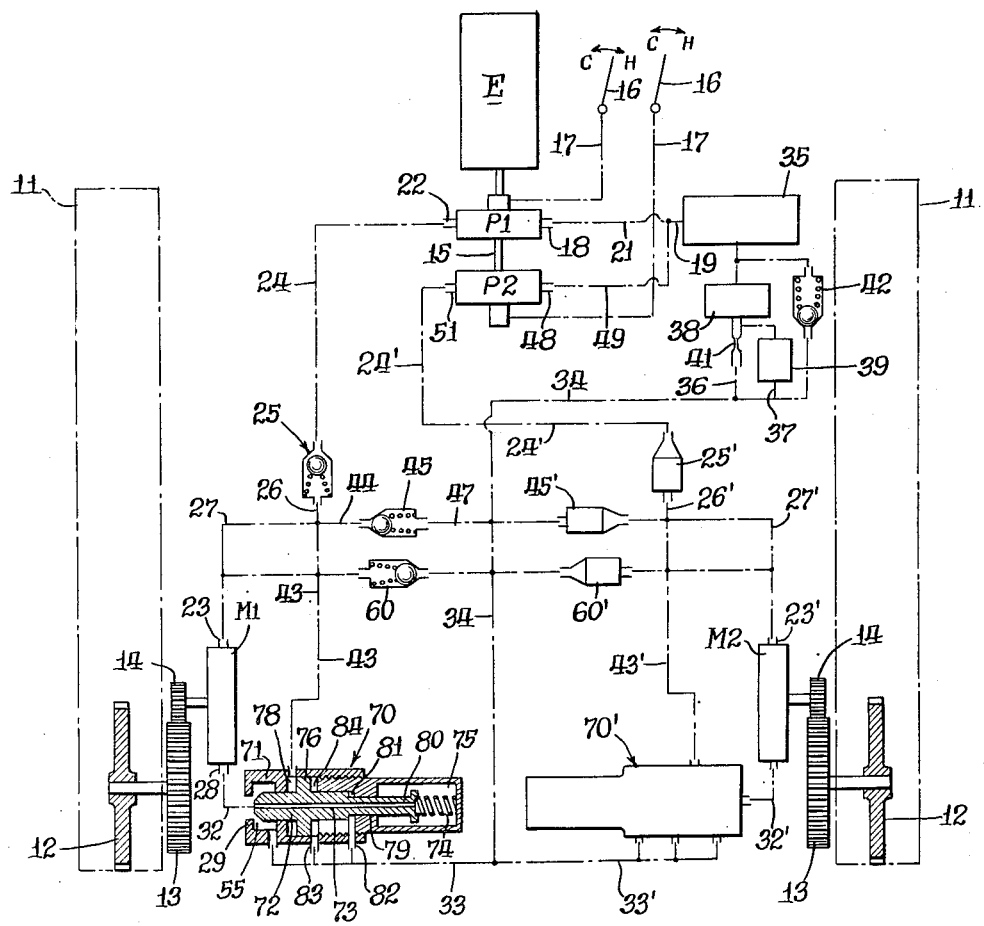
INVENTOR.
William W. Henning
BY Paul O. Pippel
Atty Patented June 3, 1952

2,599,450

UNITED STATES PATENT OFFICE 2,599,450

ROTARY PUMP AND MOTOR HYDRAULIC TRANSMISSION SYSTEM

William W. Henning, Riverside, Ill., assignor to International Harvester Company, a corporation of New Jersey Application June 20, 1947, Serial No. 756,074

4 Claims. (Cl. 60—53)

This application concerns hydraulic power transmitting systems for transmitting driving force from a vehicle engine to propelling units of the vehicle, and relates more particularly to hydraulic braking means associated with the system for preventing uncontrolled vehicular movement.

It is customary in hydraulic power transmitting systems for vehicles to provide an engine driven pump for supplying propelling fluid to a hydraulic motor connected with traction wheels or the like of the vehicle. It has also been contemplated to employ a variable capacity pump as an expedient for varying the speed at which the motor and the traction means are driven. In the operation of a vehicle driven by a hydraulic system of the character just referred to, there are times when the motor will be caused to operate as a pump. Such condition arises when, for example, the vehicle is proceeding downhill and the variable capacity pump is adjusted to a non-delivery condition. The inertia of the vehicle, and sometimes of a load coupled therebehind, will then cause the unit normally acting as a motor to act as a pump and, if the inertia of the vehicle and load is large, the resistance offered by the motor then operated as a pump will not be sufficient to oppose the vehicular movement. Such resistance of the motor to vehicular movement has been heretofore augmented by means of a throttling or braking valve in the exhaust line of the motor.

The principal object of this invention is the provision of an improved braking valve of this character, and hydraulic controls for this valve.

A more specific object is the provision of a novel hydraulic braking unit including a braking valve closable when a plunger within the unit is moved in one axial direction, a chamber receivable of fluid for urging the plunger in the valve closing direction, a bore extending axially through the plunger for providing communication between the chamber and the outlet of the vehicle motor, and a second chamber communicative with the high pressure section of the hydraulic power transmitting system for receiving fluid therefrom under pressure actable upon a portion of the plunger for moving it in the opposite direction for opening the valve, whereby the braking valve will have no throttling effect upon the output of the motor when power is being transmitted from the pump to such motor.

The above and other desirable objects inherent in and encompassed by the invention will become more fully comprehended after reading the ensuing description with reference to the annexed drawing, wherein The single figure is a view, principally diagrammatic, illustrating a preferred form of the invention incorporated into a power transmitting hydraulic circuit installed between an engine and propelling treads of a crawler tractor.

With continued reference to the drawing, there is diagrammatically shown an engine E of a crawler tractor having endless propelling treads or units 11 at opposite sides of the vehicle. These treads 11 are driven by respective drive sprockets 12 which are constrained for rotation with gears 13. Driving pinions 14 respectively drivable by hydraulic motors M–1 and M–2 are in meshed driving relation with the gears 13. The units 11 are positively connected with their respective motors M–1 and M–2 through the gearing 12—13—14, wherefore hydraulic retarding of the motors has a braking action on said units which therefore constitute propellable and brakable units.

When the hydraulic motors M–1 and M–2 are driven at the same speed, the two propelling units 11 will be driven at the same speed and cause the vehicle to proceed along a straight course. Simultaneous variation in the speed of motor M–1 and M–2 in like amounts will change the speed of the vehicle in a straight course, whereas operation of the motors M–1 and M–2 at different speeds will cause the propelling units 11 to operate at different speeds and change the course of the vehicle from the straight line course.

A hydraulic system for controlling the speeds of the motors M–1 and M–2 and for transmitting driving force thereto from the engine E includes pumps P1 and P2 having their driving elements coupled to an engine driven shaft 15. Each of the pumps is of variable capacity and has a capacity varying control element 16 operatively connected thereto by diagrammatically shown connections 17. It will be assumed that, when either control element 16 occupies a position at the "C" limit of its adjustable range C—H, the associated pump P1 or P2 will be adjusted for causing zero output of fluid; that when the element 16 is moved to the "H" limit of its adjustable range, maximum output of the associated pump will be attained and that adjustments in between the range limits C and H will cause pump delivery proportional to the distance the element is moved from the limit C toward the limit H.

Pump P1 has an inlet 18 communicating with a reservoir 35 through conduits 19 and 21. Outlet, 22, of this pump communicates with an inlet 23 of the motor M-1 through a conduit 24, a check-valve 25 and conduits 26 and 27. An outlet 28 of the motor M-1 communicates with the low pressure section of the hydraulic system including a braking valve 29 of a hydraulic braking unit 70. This low pressure section of the system includes a conduit 32 leading to the unit 70, and conduits 33 and 34 which communicate with the reservoir 35 through conduits 36 and 37 respectively, including a cooler 38 and a filter 39. Conduit 36 contains a passage constricting unit 41 for increasing the amount of oil flowing through the filter. A pressure relief valve 42 is also connected between the conduit 34 and the reservoir 35.

A high pressure section of the system comprises conduits 24 and 27 and also conduits 44 and 43 which lead respectively to a pressure relief valve 45 and a control chamber 78 of the braking unit 70. Another conduit 47 communicates between the discharge end of the pressure relief valve 45 and the conduit 34.

Fluid for the pump P2 enters its inlet 48 from the reservoir 35 through the conduit 19 and a conduit 49. The outlet 51 of the pump communicates with an inlet 23' of the motor M-2 through a conduit 24', check valve 25' and conduits 26' and 27'. Those parts associated with the output of the pump P2 and designated by the reference character including a prime correspond respectively to elements associated with the output of pump P1 designated by the same reference characters without the prime. Check valves 60 and 60' are communicatively connected between the low pressure conduit 34 and the motor inlets 23 and 23', respectively.

Since the hydraulic braking units 70 and 70' are identical, only the unit 70 is herein illustrated and described in detail. This unit 70 comprises a casing 71 slidably containing a plunger 72 wherein there is a bore 73 extending between opposite ends. The braking valve 29 at the left end of the casing is closed by the plunger 72 when it is allowed to be moved to the left under the force of a spring 74 in a spring chamber 75. The valve 29 is in series with a chamber-like passage 55 between the conduits 32 and 33. A fluid operated device comprising a cylindrical enlargement 76 on an intermediate portion of the plunger 72 is adapted to move the plunger to the right in opposition to the spring 74 when fluid is introduced into the annular control chamber 78 through the conduit 43. The pressure of fluid in the conduit 32 is transmitted through the plunger bore 73 into the spring chamber 75 and thereby diminishes the amount of force necessary to be exerted by the spring 74 and consequently the size of such spring. Fluid which may leak from the spring chamber 75 past a bearing 79 for a reduced diameter end portion 80 of the plunger 72 is caught in chamber 81 from which it is drainable through a conduit 82 into the low pressure section of the system. A similar conduit 83 is provided for a chamber 84 into which fluid may leak from the control chamber 78 past the enlarged piston portion 76 of the plunger.

*Operation of the apparatus*

The parts are illustrated in the positions occupied when the vehicle is being driven at a moderate speed along a straight course. Each of the control levers 16 is substantially midway of its adjustable range whereby the pumps P1 and P2 are caused to deliver fluid at a moderate rate. So long as the vehicle is traveling under load conditions, that is, under conditions requiring power from the engine for driving the propelling units 11, fluid from the pump P1 will be under high pressure and in passing through the motor M-1 from its inlet 23 to its outlet 28 will cause operation of this motor and of its propelling unit 11. Fluid discharged from the motor outlet 28 will be conducted through the conduit 32 to the valve 29 and past this valve through the chamber passage 55 to the conduit 33 for ultimate delivery into the reservoir 35. The high pressure fluid in the conduit 43, which is part of the high pressure section of the hydraulic system, is imposed into the braking unit chamber 78 where sufficient pressure is developed thereby for moving the piston-like enlargement 76 and the valve plunger 72 to the right while compressing the spring 74. The valve 29 will thus be widely opened so as to avoid having a throttling effect upon the fluid discharged from the motor outlet 28 during the transmission of power from the pump P1 to the motor M-1. This same condition prevails on the right side of the vehicle with respect to the pump P2, the motor M-2 and the hydraulic motor brake unit 70'.

Assume now that the vehicle is towing a loaded trailer, and assume that this vehicle train commences to descend a grade of sufficient steepness that inertia of the train would cause it to proceed at a speed in excess of the desired speed. Under these circumstances the operator will set the control levers 16 in a position causing fluid delivery to the pumps P1 and P2 at a rate corresponding to the desired rate of vehicle travel. Pressure in the normally high pressure section of the system, including the conduits 24 and 43, will thereupon drop, enabling the spring 74 of the hydraulic braking unit 70 to place the valve 29 in a throttling condition creating resistance to discharge of fluid from the motor M-1 and consequently creating a braking effect upon the vehicle. The same action will be taking place for the motor M-2 and its braking unit 70'.

Should the operator find that the vehicle train is descending the grade at greater speed than desired, he will simply move the control members 16 further toward the "C" limit of their adjustable range to diminish the output of the pumps P1 and P2, thereby further diminishing the pressure in the conduits 43 and 43' and the braking unit chambers 78 and 78', whereby the springs as 74 can press the valves as 29 into an increased throttling relation with corresponding greater braking effect. With this system of pressure responsive fluid braking there is effected automatic braking action which causes the vehicle to proceed downhill without gaining any speed and without the necessity of the operator applying a brake or changing the setting of the hydraulic pumps.

Normally, the check valves 60 and 60' will remain closed. Their sole purpose is to establish communication between the low pressure section of the system and their respectively associated high pressure section for supplying fluid to the inlets of motors M-1 and M-2 to prevent starving of the inlets of these motors under an emergency condition where the vehicle train may be descending a grade of sufficient steepness to cause the vehicle train to continue moving, subsequent to movement of the control levers 16 to the position causing no delivery of the pumps P1 and P2 for the purpose of stopping the same. If the output of the pumps P1 and P2 should be stopped and the momentum of the vehicle should continue to carry it along the course, the motors M-1 and M-2, then operating as pumps, would very quickly empty themselves and the high pressure sections of the system of fluid so there would be none to discharge past the braking valves as 29 (assuming the valves 60 and 60' not present), so that substantially all braking resistance would be lost. However, this condition cannot prevail when the valves 60 and 60' are installed, since the motors M-1 and M-2, operating as pumps, would draw fluid through these valves from the low pressure section of the system for pumping past the braking valves as 29. The vehicle would normally be supposed to stop when the control levers 16—16 are moved to the position "C" causing the pumps $p^1$ and $p^2$ to deliver and receive no fluid. Consequently, the springs as 74 in the braking devices 70 and 70', when unopposed by the pressure of fluid from these pumps into the chambers as 78, will prevent discharge of fluid past the valves excepting by abnormal pressure of fluid discharged by the "pump-operated" motors, M1—M2. Fluid passing the valves as 29 under these circumstances reaches the low pressure side of the system through the conduits 32—33'.

Having thus described a preferred embodiment of the invention with the view of clearly and concisely illustrating the same, I claim:

1. In a hydraulic power transmission system for driving a propellable and brakable unit, a variable capacity pump having an inlet communicative with a low pressure section of said system and an outlet connected with a high pressure section of such system, a hydraulic motor drivingly connected with said unit, said motor having an inlet connected with the high pressure section of the system and an outlet connected with the low pressure section of the system, a braking valve interposed between the outlet side of the motor and the low pressure section of the system, means including a fluid operated device energized by the pressure of fluid discharged from the motor outlet tending to close said valve, means responsive to the transmission of fluid under pressure from the pump to the motor for opening the braking valve, and a check valve connected between the motor inlet and the low pressure section of the system for supplying fluid to the motor independently of the pump.

2. In a hydraulic power transmission system for driving a propellable and brakable unit, a variable capacity pump having an inlet communicative with a low pressure section of said system and an outlet connected with a high pressure section of such system, a hydraulic motor drivingly connected with said unit, said motor having an inlet connected with the high pressure section of the system and an outlet connected with the low pressure section of the system, a braking valve interposed between the outlet side of the motor and the low pressure section of the system, said valve being operable to resist discharge of fluid from the motor outlet and thereby serve as a motor brake, means responsive to the transmission of fluid under pressure from the pump to the motor for contravening the braking function of the braking valve, and brake valve control means operable responsively to the pressure of fluid transmitted from the motor outlet to the brake valve for tending to establish the braking function of such valve.

3. In a hydraulic power transmission system for driving a propellable and brakable unit, a pump having an inlet communicative with a low pressure section of said system and an outlet connected with a high pressure section of such system, a hydraulic motor drivingly connected with said unit, said motor having an inlet connected with the high pressure section of the system and an outlet connected with the low-pressure section of the system, a hydraulic braking unit comprising a casing, a fluid-conducting passage extending through said casing and connected between the motor outlet and the low pressure section of the system, a braking valve in said casing in series with said passage and comprising a plunger movable endwise in one direction for at least partly closing such valve and thereby throttling the flow of fluid through the passage to produce a braking action for the motor, said plunger having a section having an annular enlargement circumscribing the same, said casing having an annular control chamber circumscribing said plunger section and adapted to receive fluid under pressure for exerting a force against said plunger enlargement for moving the plunger in the opposite direction to open said valve, said plunger having a reduced diameter end portion, said casing having a spring chamber receiving the reduced end portion of the plunger and adapted to receive pressure fluid for exerting a force against the plunger to urge the same endwise in the one direction for closing the valve, a spring in said spring chamber to urge the plunger in the one direction, conduit means communicating between the spring chamber and the motor outlet, and conduit means communicating between the high pressure section of the system and said control chamber.

4. The combination set forth in claim 3, wherein the end of the plunger opposite from the reduced diameter end portion is subjected to the pressure of fluid discharged from the motor outlet to urge the plunger in the axial direction for opening said valve, and wherein the conduit means communicative between the spring chamber and the motor outlet includes an axial bore through the plunger.

WILLIAM W. HENNING.

REFERENCES CITED

The following references are of record in the file of this patent:

UNITED STATES PATENTS

| Number | Name | Date |
|---|---|---|
| 1,111,994 | Ciarlo | Sept. 29, 1914 |
| 1,307,819 | Janney | June 24, 1919 |
| 1,615,341 | Murray | Jan. 25, 1927 |
| 1,970,181 | Monroe | Aug. 14, 1934 |
| 2,275,321 | Scates | Mar. 3, 1942 |
| 2,335,305 | Parsons | Nov. 30, 1943 |